Figure 1:
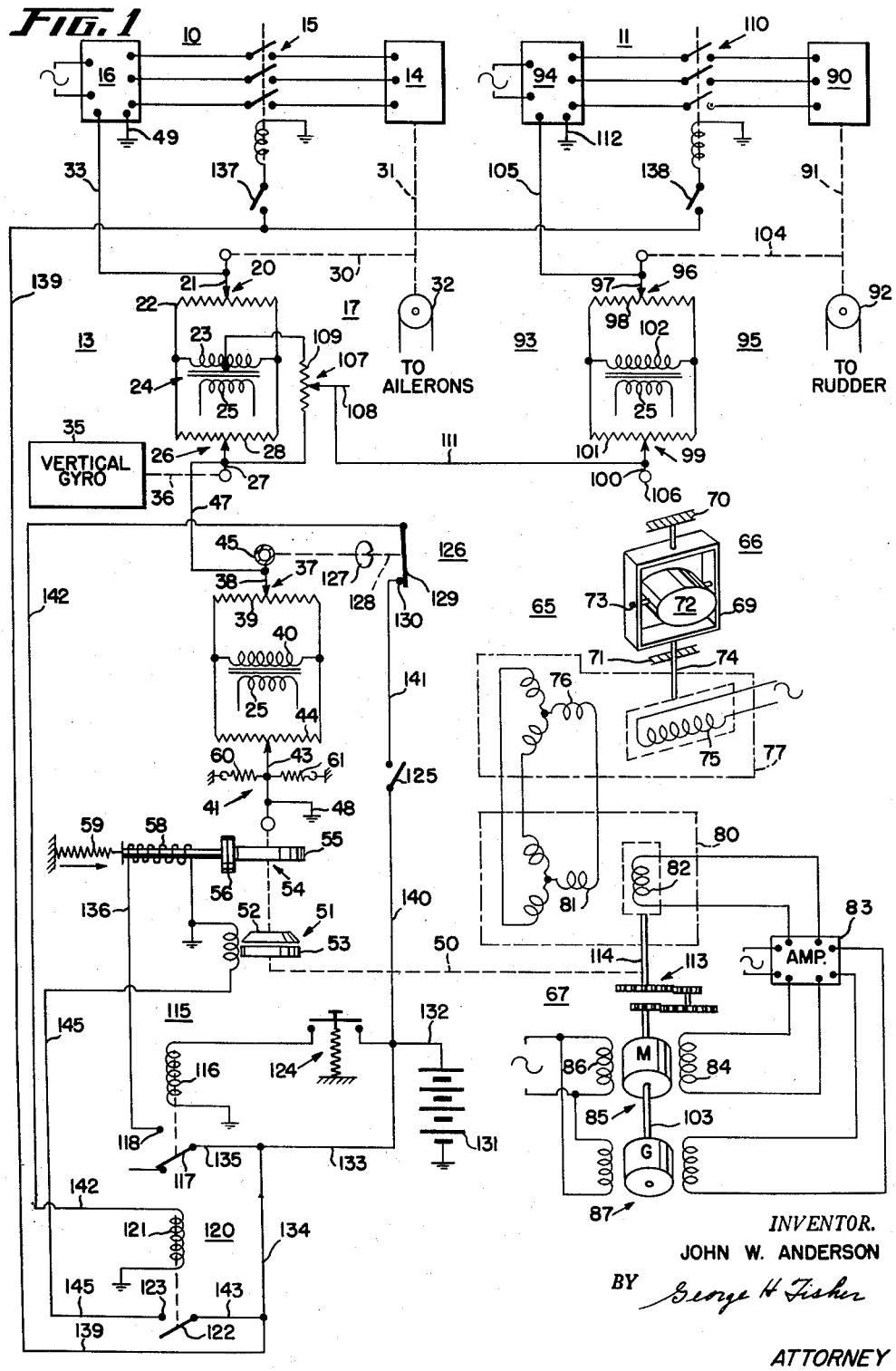

Feb. 10, 1959  J. W. ANDERSON  2,873,076
AIRCRAFT AUTOMATIC CONDITION CONTROL APPARATUS
Filed April 1, 1954  2 Sheets-Sheet 1

INVENTOR.
JOHN W. ANDERSON
BY George H Fisher
ATTORNEY

Feb. 10, 1959     J. W. ANDERSON     2,873,076
AIRCRAFT AUTOMATIC CONDITION CONTROL APPARATUS
Filed April 1, 1954     2 Sheets-Sheet 2
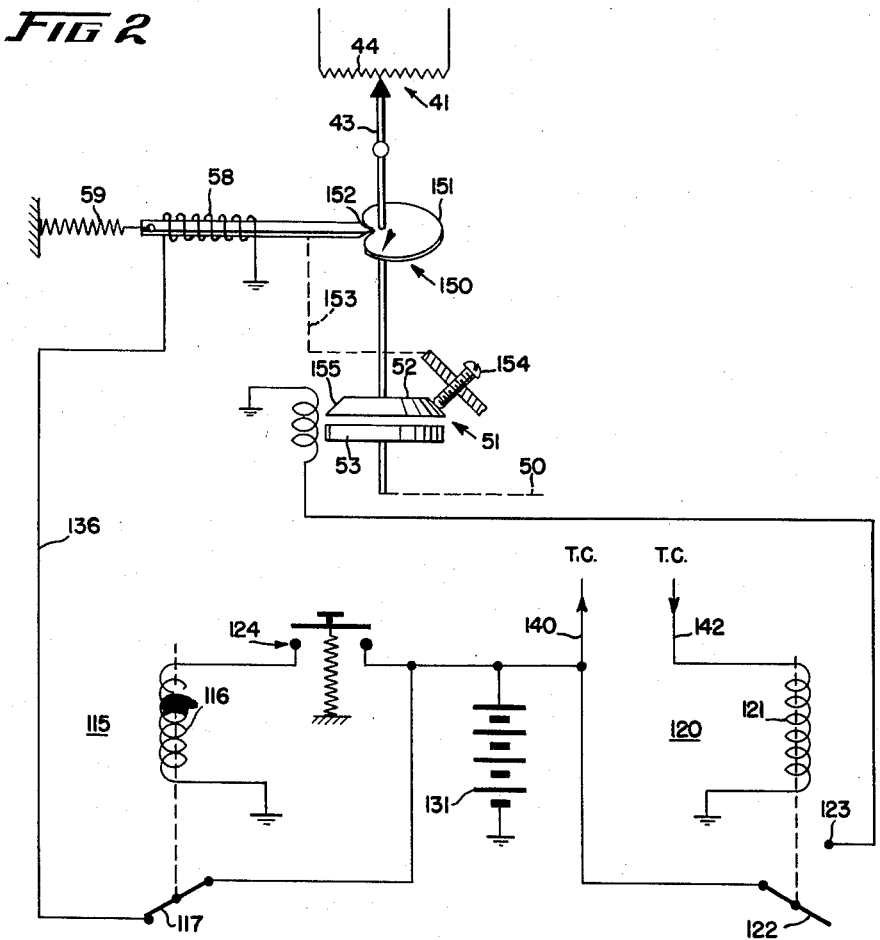
*INVENTOR.*
JOHN W. ANDERSON
BY *George H Fisher*
*ATTORNEY*

United States Patent Office 2,873,076
Patented Feb. 10, 1959

2,873,076

AIRCRAFT AUTOMATIC CONDITION CONTROL APPARATUS

John W. Anderson, Edina, Minn., assignor to Minneapolis-Honeywell Regulator Company, Minneapolis, Minn., a corporation of Delaware Application April 1, 1954, Serial No. 420,265

17 Claims. (Cl. 244—77)

This invention relates to automatic condition control apparatus for maintaining a condition at a predetermined magnitude and permitting the selection of a new magnitude of the condition which is to be stabilized. In such apparatus, a magnitude of the condition is maintained by a motor control system. The system is controlled from a condition sensing device which on change in the condition from a selected magnitude or datum senses the direction of the departure from the selected magnitude and develops a signal accordingly. The motor control system in response to this signal operates a condition controlling device to restore the original magnitude of the condition. When a different magnitude of the condition to be maintained is desired, a manually initiated signal may be used to control the motor control system to operate the device. During the manual control of the system, the condition sensing device is rendered ineffective to control the motor control system.

The apparatus is disclosed as being applied to an automatic pilot for an aircraft. The condition to be maintained is the heading of the craft on a selected course. The condition sensing device is a heading responsive means which operates the rudder and aileron control surfaces through a motor control system to maintain heading. Changes in heading may be effected manually through the motor control system during which period the heading sensing device is rendered ineffective to control the motor control system.

During transient disturbances of the craft tending to drive it off heading, the heading sensing device through the motor control system, which may be of the proportional type wherein the amount of control surface displacement is proportional to the heading error signal, may effect return of the craft to the heading to be maintained. In instances where there is an out of trim condition of the craft itself or there is a permanent disturbing force tending to change the craft heading, the heading responsive device which provides a signal proportional to heading error to the proportional control system will not return the craft to its original heading. The heading sensing device in such instances as in the out of trim condition will supply a residual signal which is balanced by the follow-up signal from the motor control system or the residual signal will be balanced by a vertical gyro bank signal if the autopilot and aircraft are engaged when the craft is banked. Thus there will be a residual heading error signal and a residual rebalance signal from the motor control system.

Heretofore, should it be desired to manually change the heading through the motor control system which also requires rendering the heading maintaining signal ineffective on the motor control system, on initiation of the manual change in heading, the residual signal in the motor control system will cause an unwanted operation of the system.

With the apparatus of this invention, the residual signal from the heading maintaining means is retained during the manual changes of heading but further change thereof during the manual change of heading is prevented, and the unwanted operation of the motor control system does not occur. However, removal of the residual heading error signal is effected as when the control surfaces are being directly manually operated to place the craft on a selected heading prior to their operation by the motor control system. Manual operation as stated permits placing the craft on a desired heading with the surfaces in unoperated position but such heading will not be maintained unless the residual apparent heading error signal is removed or made ineffective prior to engagement of the automatic control apparatus to the control surfaces of the aircraft.

It is an object of this invention therefore to provide novel means to retain a residual heading error signal in an automatic heading maintaining apparatus during manual changes in heading through the apparatus.

It is a further object of this invention to provide novel means to prevent alteration in a residual heading error signal in a heading stabilizing apparatus during manual changes in heading through the apparatus.

It is another object of this invention to provide for the removal of the residual apparent heading error signal in a heading stabilizing apparatus prior to the automatic heading stabilizing control application to the control surfaces of the aircraft.

The above and further objects of the invention and the manner in which it is to be performed will be more clearly understood by reference to the following description in conjunction with the accompanying drawings which illustrate a preferred embodiment thereof. In said drawing:

Figure 1 illustrates in schematic form an automatic pilot for controlling ailerons and rudder of an aircraft to maintain craft heading, together with manual means to change heading through the automatic pilot while maintaining a residual heading error signal.

Figure 2 discloses a modification of a portion of the structure in Figure 1 for maintaining the heading error signal during manual changes in heading and for removing the heading error signal prior to automatic control.

In the control apparatus embodying the invention, the ailerons and rudder control surfaces of an aircraft are operated by respective servomotors which are controlled by separate balanceable control systems comprising primarily a heading error signal generator and a rebalance signal generator operated by the respective servomotor. The heading error signal generator is positioned by a heading responsive device through a series of mechanical elements comprising a clutch which may separate the signal generator from the heading responsive device. Means are provided to effect this disconnection of the clutch elements during manual operation of the balanceable control systems to change heading. During such manual changes in craft heading the heading error signal generator is held in any position it may have assumed when manual change in heading was initiated. This residual signal is retained upon moving of the manual signal generator to unoperated position. The driving means for the heading error signal generator also includes provisions for removing the residual signal upon initial setting up of the apparatus prior to applying automatic control to the ailerons and rudder which had been directly manually positioned to select a desired heading.

Referring to Figure 1, an automatic pilot for controlling the craft heading comprises aileron channel 10 and rudder channel 11. The aileron channel comprises a servo system for positioning ailerons (not shown) of the aircraft. The servo system comprises a servomotor 14 which may be operatively connected with the aileron control surfaces and a motor control system 13. The motor control system 13 comprises an amplifier 16 and balanceable network 17 connected thereto. The amplifier 16 is of the A. C. discriminator type and receives control signals from the balanceable network 17. The amplifier 16 through an aileron engage relay 15 reversely controls the servomotor 14 depending upon the phase of the alternating signal supplied to amplifier 16 from network 17. The motor 14 in turn operates to rebalance the network 17 while positioning the aileron control surfaces. When the relay 15 is energized but the motor 14 not energized, the control surfaces are held in their assumed positions despite aerodynamic loading thereof. The amplifier and servomotor arrangement may be similar to that disclosed in Patent No. 2,425,734 dated August 19, 1947, to Willis H. Gille et al.

The balanceable network 17 comprises a plurality of series connected electrical signal voltage generators, comprising a follow-up potentiometer 20, a roll attitude potentiometer 26, a manual turn control potentiometer 37, and a heading maintaining potentiometer 41. The follow-up potentiometer 20 comprises a slider 21 and resistor 22, and the potentiometer 26 comprises a slider 27 and resistor 28. The resistors 22 and 28 are connected in parallel across the ends of a secondary winding 23 of a transformer 24 having a primary winding 25. Slider 21 is positioned along resistor 20 in either direction from its electrical center by an operating connection 30, 31 extending from the aileron servomotor 14. The operating connection 31 is extended to carry a cable drum 32 from which cables extend for operating aileron surfaces. A conductor 33 extends from one control electrode terminal of amplifier 16 to slider 21. Slider 27 is positioned along resistor 28 in either direction from the center thereof in accordance with the roll angle of the aircraft by a conventional vertical gyroscope or horizon gyroscope 35 through the operating means 36 connected to slider 27. Potentiometer 37 comprises a slider 38 and resistor 39; potentiometer 41 comprises a slider 43 and resistor 44. Resistors 39 and 44 are connected in parallel across the ends of a secondary winding 40 of the transformer 24. In the construction used, a single transformer having a plurality of secondary windings which energize potentiometer resistors is supplied from a single primary winding. Slider 38 is positioned along resistor 39 from a manually operable turn control knob 45. A conductor 47 connects slider 38 with slider 27. A conductor 48 extends from slider 43 to ground and thence through amplifier ground conductor 49 to the other amplifier control electrode. The amplifier 16 is also connected to a source of electrical voltage and through a discriminator arrangement operates one or another of a pair of relays depending upon the phase of the signal voltage across the electrode conductors 33, 49 with respect to the alternating voltage from the supply. The slider 43 of the heading stabilization potentiometer 41 is positioned from an output shaft 50 of a heading deviation detector through a plurality of mechanical transmisison elements comprising a magnetic clutch 51 and a locking arrangement 54. The clutch 51 comprises a driving member 53 integral with shaft 50 and a driven member 52 connected with slider 43. The locking means comprises a circular member 55 integral with the driven clutch member 52 and a coacting brake member 56 engageable with the periphery thereof. The locking means 54 additionally includes an energizing winding 58 for retracting the brake shoe 56 and a spring 59 for urging the shoe 56 in contact with the member 55. A pair of centering springs 60, 61 extend from opposite sides of the slider to the frame so that upon energizing of winding 58 and the deenergization of the magnetic clutch 51 the springs 60, 61 center the slider 43 with respect to resistor 44. The shaft 50 is driven by a heading responsive device 65 comprising a sensitive heading deviation detector 66 and a deviation detector coupler 67 for transmitting the errors detected by the device 66 to the slider 43. The heading detector 66 may be a directional gyroscope comprising an outer gimbal 69 rotatably carried in upper and lower bearings 70, 71 for movement about a vertical axis. A rotor casing 72 is supported about a horizontal axis 73 in the outer gimbal 69. The casing 72 in turn rotatably supports the rotor (not shown) of the gyroscope for rotation about a horizontal axis perpendicular to axis 73. Depending from the gimbal 69 and passing through bearing 71 is a member 74 which supports a rotor winding 75 of a synchro transmitter 77. Winding 75 is connected to the alternating voltage supply. The synchro 77 includes stator windings 76.

The coupler 67 comprises additionally a control transformer 80 having three phase windings 81 connected to the windings 76 of synchro 77 and a rotor winding 82 inductively associated with winding 81. Upon change in the relative positions of rotor windings 75 and 82 a heading error voltage is induced in rotor winding 82. The heading error voltage from winding 82 is supplied to an amplifier 83. The amplifier 83 is of the A. C. discriminator type, and its output is applied to an amplifier phase winding 84 of a motor 85. The motor 85 may be a capacitor type induction motor or a two phase induction motor, and its other phase winding is connected to the alternating voltage supply. The rotor of the motor 85 is connected to a shaft 103 which drives a velocity signal generator 87 of conventional type. The output of the velocity generator 87 is also supplied to the amplifier 83. The motor shaft 103 is connected through a gear train 113 and output shaft 114 to the synchro rotor 82 to place it in a null position whereby the input to the amplifier 83 is balanced. The output shaft 114 used for aileron rigging beyond the gear train 113 also drives the shaft 50 for positioning the potentiometer slider 43. Thus the slider 43 is positioned in accordance with the heading deviation error detected by the gyroscope 66.

The rudder channel 11 comprises a rudder servomotor 90 and a motor control system 93. The motor control system 93 comprises a discriminator amplifier 94 and a balanceable network 95. The servomotor 90 is reversely controlled through a rudder engage relay 110 from the discriminator amplifier 94 in accordance with the phase of a control signal derived from network 95 relative to the supply voltage connected to amplifier 94. The motor 90 through its output shaft 91 operates a cable drum 92 from which extend suitable cables for operating the rudder surface (not shown) of the aircraft.

Network 95 comprises a rebalancing potentiometer 96, a trim potentiometer 99, a voltage dividing potentiometer 107, the turn control potentiometer 37 in the aileron network 17, and the heading error potentiometer 41. The potentiometer 96 comprises a slider 97 and resistor 98; the potentiometer 99 comprises a slider 100 and resistor 101. The resistors 98 and 101 are connected in parallel across a secondary winding 102 of the transformer 24. Slider 97 is positioned along resistor 98 from a follow-up connection comprising servo output shaft 91 and an extension 104 therefrom to slider 97. A conductor 105 connects slider 97 with one control electrode of amplifier 94. Slider 100 may be positioned along resistor 101 by manually operable knob 106. Voltage dividing potentiometer 107 comprises an adjustable tap 108 and a resistor 109. The resistor 109 is connected between a center tap of secondary winding 23 and the slider 27. Thus depending upon the adjustment of slider 108 along resistor 109 a selected portion of the signal provided by potentiometer 26 is also supplied to the rudder channel 11. The signal generators 37 and 41 have been previously described in connection with network 17.

A conductor 111 extends between adjustable tap 108 and slider 100. The control circuit is completed from network ground conductor 48 to amplifier ground conductor 112.

In addition to the relays 15 and 110 for respectively connecting the servomotor 14 with the aileron control surface and the motor 90 with the rudder control surface as well as connecting the servomotors 14 and 90 with their respective amplifiers 16 and 94, the apparatus additionally includes a brake control relay 115 and a clutch control relay 120. The relay 115 comprises an operating winding 116 for operating an arm 117 for engagement with an in contact 118. The relay 120 comprises an operating winding 121 for operating an arm 122 into engagement with an in contact 123. The circuit through relay winding 116 is controlled from a manually operable normally open momentarily closed switch 124. The circuit through relay winding 121 is controlled by a manually operable normally open two position switch 125 and a turn control switch 126 operable mechanically in parallel with slider 38 from the turn control knob 45. The switch 126 comprises two coacting switch elements 129 and 130. The switch elements are normally in circuit closing relationship. The element 129 is an operable arm actuated by a follower 128 extending therefrom and which in normal position engages a sector slot in member 127 connected with the turn control knob 45. As the knob 45 is rotated the follower 128 due to the rotation of the member 127 rides out of the sector slot and engages the periphery of member 127 thereby opening or separating the elements 129, 130.

To control the aircraft from the apparatus, the ailerons and rudder surfaces are directly manually controlled to place the craft on a desired heading. Thereafter the normally open switch 124 is closed to complete a circuit from battery 131, conductor 132, switch 124, relay winding 116 to ground and return to battery. The operation of relay 115 completes a circuit from battery 131, conductor 132, conductor 133, conductor 135, relay arm 117, in contact 118, conductor 136, to brake retracting winding 58, to ground and battery return. With brake shoe 56 released from the member 55, springs 60 and 61 center the slider 43 of potentiometer 41. Thereafter, closing of the single pole two position switch 137 energizes the aileron engage relay winding directly from battery 131 through conductors 132, 133, 134, 139. Similarly the operation of the manually operable single pole double throw switch 138 energizes the operating winding for the rudder engage relay 110 from conductor 139. Thus the aileron servomotor 14 and the rudder servomotor 90 are respectively engaged with their control surfaces. With the craft on the heading to be stabilized as determined by the manual operation of the rudder and aileron control surfaces, the clutch control switch 125 which is of the single pole double throw type is moved to closed position and with the turn control knob 45 in its normal position, the magnetic clutch 51 is controlled by a circuit comprising battery 131, conductor 132, conductor 140, switch 125, conductor 141, switch elements 130, 129, conductor 142, and relay winding 121 to ground and return to battery 131. The magnetic clutch is now energized from a circuit extending from energized conductor 134, conductor 143, relay arm 122, in contact 123, conductor 145, magnetic clutch 51, to ground and return to battery 131. The output shaft 50 of the coupler 67 is thus operatively connected with the slider 43. At this time, the brake shoe 56 engages the member 55 since switch 124 had been merely momentarily closed to permit the centering of slider 43.

As the craft changes its heading, due to a transient disturbance, the slider 43 is positioned along resistor 44 by the shaft 50. The motor 85 exerts sufficient torque to operate slider 43 against the frictional resistance between the brake shoe 56 and the member 55 and the resistance of springs 60, 61. The heading deviation detector 66 thereby controls the aileron and rudder control surfaces through potentiometer 41 to maintain the craft on a selected heading.

When a manual turn control or manual change in heading is to be effected through the apparatus, the control knob 45 is operated to displace slider 38 of potentiometer 37. This displacement of slider 38 like potentiometer 41 provides a control signal in both aileron amplifier-control network 17 and rudder amplifier-control network 95. At the same time, the rotation of member 127 opens contacts 129 and 130 thereby opening the electrical circuit through relay winding 121 so that arm 122 drops to the out position shown. The circuit through the magnetic clutch 51 is thereby opened at "in" contact 123 and relay arm 122 thereby the driven clutch member 52 is no longer positioned from the driving member 53. Due to the engagement of the brake shoe 56 with the member 55, the slider 43 is held in its adjusted position despite the influence of centering springs 60 and 61. Thus if any residual signal existed in potentiometer 41 it would be retained during a manual change in heading through the apparatus. As the craft attains a selected heading, the turn control knob 45 is moved back to its normal position at which time the switch contacts 129 and 130 are again in engagement to energize relay 120. The magnetic clutch 51 is reenergized to couple the slider 43 with the coupler output shaft 50.

The residual signal in potentiometer 41 referred to may result where the craft has directional instability. If the craft of itself such as due to mistrim tends to change heading, the heading detector 66 will operate the slider 43 tending to restore the craft to the heading to be maintained. Because of the tendency of the craft to continually change heading were the original heading restored, the gyroscope 66 in stabilizing heading of the craft would not when applying a heading correction be able to return the craft to the original heading when the craft is so out of trim. The craft eventually will assume a heading slightly off the heading to be maintained. The aileron network 17 is balanced by a displacement of the follow-up potentiometer 21 balancing the heading error signal in potentiometer 41 and in the rudder network 95 by the follow-up potentiometer slider 97 displacement balancing the heading error signal from potentiometer 41. The displacement of the aileron and rudder surfaces so obtained tends to prevent further change in heading of the craft due to the out of trim condition.

During manual heading changes through the potentiometer 37, if the brake 54 comprising the brake shoe 56 and the member 55 were not provided to prevent the return of the slider 43 to the center position by springs 60 and 61 to remove the residual heading error signal in potentiometer 41, it is apparent that the networks 17 and 95 respectively would be immediately unbalanced by the signals from follow-up potentiometers 20 and 96 resulting in displacement of the rudder and aileron surfaces tending to, in some instances, cause a change in heading of the craft opposite to that desired by operation of the turn control knob 45.

When desired, the residual heading error signal in potentiometer 41 may be removed by the momentary operation of switch 124 to remove the brake loading on slider 43 with the switch 125 in open position. Thus it is evident that the residual signal may be selectively removed when the out of trim condition of the aircraft is corrected.

While the coupler motor 85 may function as a torque amplifier between the gyroscope 66 and the potentiometer slider 43 so that the gyroscope 66 is not affected by the opposition supplied by centering springs 60, 61 and brake 54, it may be desirable in some instances to directly couple the heading error detector to slider 43 of the heading error potentiometer 41. In such case, it is undesirable to load the heading error detector with the opposing force of the centering spring 60, 61 and the brake mechanism 54 during automatic stabilization of heading. To overcome such loading effects on the heading detector, an alternative arrangement is provided in Figure 2. In the arrangement in Figure 2, the shaft 50, which may be directly positioned from a heading detecting device such as gyroscope 66, which positions the slider 43 of potentiometer 41 through magnetic clutch 51, and a novel centering and brake device 150. The centering and brake mechanism 150 comprises a heart-shaped cam 151 shown rotated for clearness 90 degrees into the plane of the drawing. Coacting with the cam 151 is a plunger 152 which is moved into contact with the surface of cam 151 by spring 59 and withdrawn from such contact by the operating winding 58 for the plunger. Upon deenergization of winding 58, the spring 59 forces the plunger 152 rightward in the drawing whereby it engages the surface of the cam 151 causing the centering of slider 43 on resistor 44. Laterally extending from the plunger 152 is a supporting member 153 for a brake shoe 154. The brake shoe 154 may be an adjustable screw type member which engages a bevel portion 155 of the driven clutch member 52 in the declutched position and with plunger 152 retracted. The driven clutch member 52 on deenergization of the clutch 51 is axially moved by conventional spring means (not shown) so that the bevel portion 155 engages the brake member 154 to hold slider 43 of potentiometer 41 in any adjusted position resulting from the operation of gyroscope 66.

The apparatus in Figure 2 may be directly substituted for the coupler 67 and the slider operating means extending therefrom in the structure of Figure 1 so that the potentiometer slider 43 is not loaded during automatic heading control. During manual operation of the control surfaces, and prior to applying automatic control, the switch 124 may be momentarily depressed, with the switch 125 that controls the energization of magnetic clutch 51 in open position. The circuit through plunger operating winding 58 is opened by the operation of relay arm 117 and spring 59 operates the plunger 52 to center the slider 43. Again the aileron and rudder engage relay switches 137 and 138 may be closed to initiate heading stabilization and thereafter the switch 125 may be moved to closed position thereby to energize magnetic clutch 51 through operated relay 120 coupling the slider 43 with the heading detector operated shaft 50. During such stabilization, the plunger retracting winding 58 is energized through unoperated relay 115 to withdraw plunger 152 from engagement with cam 151 and the magnetic clutch 51 as stated is energized to remove the driven clutch member 52 and its surface 155 from contact with the brake 154.

With the operation of the turn control knob 45 to introduce manual change in heading, the circuit through the magnetic clutch 53 is opened because of deenergization of relay 120 permitting the driven clutch member 52 to be moved into engagement with the brake 154 while the plunger operating winding 58 remains energized. Thus the slider 43 is held in its operated position tending to retain any residual signal arising due to an out of trim condition of the craft or any permanent disturbance tending to change craft heading. When the manual turn control knob is restored to its normal position with the slider 38 centered on resistor 39, the energization circuit for clutch 51 is restored so that the shaft 50 may resume operation of slider 43.

It will now be apparent that there has been provided a condition control apparatus having a novel mechanical transmission arrangement between a condition detecting device and a signal generator operated thereby so that manual selective changes in the condition through the apparatus may be effected while a residual signal may be retained in the signal generator, with means to automatically place the signal generator in a null position prior to the introduction of automatic condition control or whenever desired. Since changes in the precise embodiments disclosed might suggest themselves, it is desired that the invention be not limited to the details described but as limited by the following claims.

What is claimed is:

1. Flight control apparatus for an aircraft, having aileron and rudder control surfaces, said apparatus comprising position maintaining means for detecting changes in heading of the craft, a heading error signal generator, means connecting said heading change detecting means and said signal generator comprising a releasable clutch and brake means; a balanceable servomotor system for operating said ailerons, a balanceable servomotor system for operating said rudder, means for controlling both systems from said signal generator, each said servo system including a follow-up signal generator for limiting the operation of its respective control surface in accordance with heading error; manual means for changing craft heading including a signal generator connected to both servo systems; means connected with the manual means for releasing said clutch upon operation of the manual means; restraining means for retaining the heading error signal generator in its adjusted position during manual changes in heading; and further means for alternatively releasing said clutch and moving said heading error signal generator to unoperated position while removing the influence of the restraining means on said signal generator.

2. In navigation apparatus for an aircraft, in combination: a heading gyroscope arranged to detect deviations in heading of said craft, a signal voltage generator having an operable member; drive means between said gyroscope and member comprising a disconnectable clutch; brake means engageable with said drive means on the driven side of said clutch, centering means for said operable member; means for disengaging said clutch and causing said brake member to engage said drive means to retain the operable member in operated position during selective changes in heading of the craft; and further means for disengaging the brake member and for centering the member of the signal generator when said clutch is alternatively disconnected.

3. Navigation apparatus for an aircraft having operable devices for controlling craft heading, said apparatus comprising: position maintaining means for detecting errors in craft heading; a signal generator comprising a potentiometer having an operable slider; disconnectable clutch means operating said slider from said detecting means to automatically maintain heading of the aircraft; holding means for engaging the driven part of said clutch member with a brake during disconnection of said clutch during which heading is altered from that being maintained the brake serving to retain the potentiometer slider in any adjusted position to conserve a residual signal opposing a persistent tendency to alter heading being maintained; a manually operable signal generator and means for alternatively controlling said operable devices from said manually operable signal generator and said potentiometer; and means for disconnecting said clutch and engaging the holding means and driven clutch member upon operation of the manual signal generator.

4. Control apparatus for operating a condition controlling device, said apparatus comprising: a condition responsive device sensing changes in the magnitude of a condition to be maintained; an electrical signal generator; drive means including a disconnectable clutch for connecting said signal generator and said condition responsive device; operable means for disengaging said clutch; brake means for retaining said signal generator in adjusted position during disengagement of the clutch; additional means effective on displacement from a normal position for changing the magnitude of the condition and controlling said operable means to effect disconnection of said clutch; selective means for resuming operation of said signal generator from said condition responsive device upon return of the additional means to normal position; and further means for also and alternatively disconnecting said clutch and automatically restoring the signal generator to unoperated position.

5. Control apparatus for an aircraft having operable devices for controlling craft attitude, said apparatus comprising: attitude responsive means for detecting changes in craft angular position; a signal voltage generator; a servo system including said signal generator operating said attitude controlling devices to correct for attitude changes; drive means including a disconnectable clutch connecting said attitude responsive means and said signal generator; spring operated centering means for said signal generator; brake means connectable with said generator drive means; control means for disconnecting said clutch and applying said brake to said drive means to permit selection of a new attitude from which changes are to be detected by said responsive means; and selective means for removing said brake means from connection with said drive means to effect operation of the generator by the centering means.

6. Control apparatus for an aircraft having devices for changing craft position, said apparatus comprising: position maintaining means for detecting craft changes in position from a datum plane; a first signal voltage generator; a servo system controlled by said first signal generator including a follow-up signal generator for operating said devices; actuating means between said position maintaining means and said first signal generator, said actuating means including a disconnectable clutch; brake means operably engageable with the actuating means; selective means for disconnecting said clutch while said brake is engaged with the actuating means to retain a residual signal in said first signal generator while changing aircraft datum position to compensate for out of trim of said craft tending to change craft position from datum; additional means for releasing said brake means from the actuating means; and means for centering said first signal generator on disconnection of the clutch and release of said brake means to enable the removal of the residual signal for absence of mistrim.

7. Condition control apparatus having operable devices for changing the condition, said apparatus comprising: condition responsive means for detecting change in the condition from a datum; a first signal voltage generator; a servo system controlled by said first signal generator and including a follow-up signal generator operating said devices in accordance with the change in the condition; actuating means between said condition responsive means and said first signal generator including a disconnectable clutch; operable brake means for opposing change in position of the signal generator to retain a residual signal offsetting a persistent tendency to change condition the retention being made during disconnection of said clutch while changing the datum condition; selective means for disconnecting said clutch to permit change in the condition datum through said servo system by operation of a third signal generator; and means for setting up said apparatus to maintain said condition including means for releasing said brake means from the actuating means and means for centering said first signal generator on disconnection of the clutch and release of said brake means prior to the manifestation of such persistent tendency.

8. In automatic control apparatus for maintaining a condition at a desired magnitude and having a condition changing device, in combination: a condition responsive device arranged to sense changes of said condition from said desired magnitude, a potentiometer having an adjustable slider, drive means between said slider and said condition responsive device for maintaining said condition, said drive means comprising a clutch and brake members, centering means connected to said slider, and selective means for disconnecting both said clutch and releasing said brake to permit moving of said slider to a null position by said centering means and further means for disconnecting said clutch while applying said brake during selected changes in the condition being maintained to prevent moving said slider to a null position by the centering means to retain a residual signal offsetting a persistent tendency to depart from the desired condition when said responsive device resumes control of said condition.

9. In an automatic control apparatus for maintaining a condition at a desired value, the combination comprising: a condition responsive device for detecting a change in magnitude of said condition; a signal generator having the movable member variably adjusted from a null position to change the magnitude of signal generated; drive means interconnecting said condition responsive means and signal generator for controlling the apparatus to maintain the condition said drive means including disconnectable clutch and brake devices; centering means for the signal generator to return the movable member to null position so that no signal is generated; selective means operable through said control apparatus to alter the present condition to a desired condition and for disconnecting said clutch and applying said brake to retain the movable member in any adjusted position to retain a residual signal offsetting a persistent tendency to alter the desired condition during subsequent automatic control; and further means for releasing said brake while said clutch is disconnected and causing the centering means to move the member to the null position to remove the residual signal on absence of such persistent tendency.

10. The apparatus of claim 9; wherein the automatic control apparatus comprises a servo system controlled by said signal generator and including a follow-up signal generator, for operating a condition changing device.

11. In an automatic pilot for an aircraft having a control surface for changing craft attitude, in combination: a follow-up servo system including a motor having an output shaft servoed to the change in craft attitude about an axis thereof; a signal generator having a movable member variably adjusted from a null position to change the magnitude of the signal generated; drive means interconnecting said output shaft and said signal generator including a disconnectable clutch and a brake device; centering means connected to the movable member to return the movable member to null position so that no signal is generated, said motor developing torque sufficient to override said centering means; selective means for disconnecting said clutch and applying said brake to retain the movable member in any adjusted position; and further means for releasing said brake while said clutch is disconnected whereby the centering means moves the movable member to the null position.

12. The apparatus of claim 11; a second servo system controlled by said first generator and including a follow-up signal generator for operating said craft control surface.

13. The apparatus of claim 12 wherein the second servo system includes a manually operable signal generator with means for operating said selective means for disconnecting said clutch while applying said brake to retain the movable member in any adjusted position whenever the manually operable signal generator is moved from a null position.

14. The apparatus of claim 13 wherein the aircraft control surface are the ailerons of an aircraft and wherein the motor output shaft is servoed to the heading responsive device for the craft.

15. Navigation apparatus for an aircraft having operable devices for controlling craft heading, said apparatus comprising: gyroscope means for detecting errors in craft heading; a first signal generator operated by said gyroscope means in accordance with heading changes; a balanceable servo system including a motor effective to null the output of the first signal generator; a second signal generator comprising a potentiometer having an operable slider; means including a disconnectable clutch having a driving and a driven element operating said slider from said motor; holding means for engaging the driven part of said clutch means with a brake during disconnection of said clutch to retain the potentiometer slider in any adjusted position assumed by operation of said motor to conserve a residual signal opposing a persistent tendency to change heading during connection of said clutch; a manually operable signal generator; means for alternatively controlling said operable devices from said manually operable signal generator to alter craft heading; and means for disconnecting said clutch and engaging the holding means with the driven clutch member upon operation of said manually operable signal generator.

16. Apparatus for controlling aircraft attitude control devices comprising: electric motor means operative to control said devices; control circuit means for said electric motor means for receiving a control signal responsive to change in desired position of the aircraft; follow-up control means operated by the electric motor responsive to the operation of the motor means and connected for supplying a follow-up signal to said motor control circuit means; anti-hunting control means for the electric motor means responsive to the rate of operation of the motor means also connected to said control circuit means; a second electrical signal generator; drive means including a disconnectable clutch for connecting said second signal generator and said electric motor means; operable means for disengaging said clutch; brake means for retaining said second signal generator in adjusted position during disengagement of the clutch to conserve a residual signal opposing a persistent tendency to change craft position while said clutch is engaged; additional means effective on displacement from a normal position for changing the position of the aircraft from present position and controlling said operable means to effect said disconnection of said clutch; selective means for resuming operation of said second signal generator from said electric motor upon return of the additional means to normal position; and further means for also and alternatively disconnecting said clutch and automatically restoring the second signal generator to unoperated position.

17. In an automatic control apparatus for maintaining a condition at a desired value, the combination comprising: a condition responsive device for detecting a change in magnitude of said condition; a signal generator having the movable member variably adjusted from a null position to change the magnitude of the signal generated; drive means interconnecting said condition responsive means and signal generator including disconnectable clutch and brake devices; centering means for the signal generator to return the movable member to null position so that no signal is generated; selective means for disconnecting said clutch and applying said brake to retain the movable member in any adjusted position; and further means for releasing said brake while said clutch is disconnected and causing the centering means to move the member to the null position; a servo system controlled by said generator and including a follow-up signal generator, for operating a condition changing device, said servo system including a manually operable signal generator for generating a signal proportional to its extent of operation with said manually operable signal generator being connected to said selective means for disconnecting the clutch when said manual means is moved from a null position.

References Cited in the file of this patent

UNITED STATES PATENTS

| | | |
|---|---|---|
| 2,512,902 | Rossive | June 27, 1950 |
| 2,589,834 | MacCallum | Mar. 18, 1952 |
| 2,591,938 | Holliday | Apr. 8, 1952 |
| 2,614,776 | Rossive | Oct. 21, 1952 |
| 2,649,564 | Meredith | Aug. 18, 1953 |